United States Patent [19]

Gui et al.

[11] Patent Number: 5,562,965
[45] Date of Patent: Oct. 8, 1996

[54] VAPOR LUBRICATION OF FRACTIONATED LUBRICANT ON THIN FILM DISCS

[75] Inventors: Jing Gui, Hayward; Bruno Marchon, Berkeley, both of Calif.

[73] Assignee: Seagate Technologies, Inc., Scotts Valley, Calif.

[21] Appl. No.: 486,882

[22] Filed: Jun. 7, 1995

[51] Int. Cl.$^6$ .................. G11B 5/00; G11B 5/82
[52] U.S. Cl. .......................... 428/65.4; 428/220
[58] Field of Search ................ 428/65.4, 900, 428/220; 427/497

[56] References Cited

U.S. PATENT DOCUMENTS

| | | | |
|---|---|---|---|
| 4,268,556 | 5/1981 | Pedrotty | 428/65 |
| 4,529,659 | 7/1985 | Hoshino et al. | 428/422 |
| 4,877,905 | 10/1989 | Chambers | 568/615 |
| 4,960,609 | 10/1990 | Homola et al. | 427/38 |
| 5,137,784 | 8/1992 | Suzuki et al. | 428/408 |
| 5,227,211 | 7/1993 | Eltoukhy et al. | 428/64 |

FOREIGN PATENT DOCUMENTS 9231005  9/1993  Japan.

OTHER PUBLICATIONS

Coffey et al., "Vapor Lubrication of Thin Film Disks", IEEE Transactions on Magnetics (Nov. 1994), 30:4146:4148.

*Primary Examiner*—Alexander Thomas
*Attorney, Agent, or Firm*—Flehr, Hohbach, Test, Albritton & Herbert

[57] ABSTRACT

Lubricated magnetic recording discs are provided by vapor deposition of narrow molecular weight fractions of a terminally functionalized perfluoropolyether. The coatings are found to provide stable lubrication over extended periods of time in CSS cycles.

6 Claims, No Drawings

ABSTRACT

VAPOR LUBRICATION OF FRACTIONATED LUBRICANT ON THIN FILM DISCS

TECHNICAL FIELD

The technical field of this invention is the lubrication of magnetic recording discs.

BACKGROUND OF THE INVENTION

Magnetic disc drive systems frequently use the contact start stop (CSS) system. In the CSS system, a recording reproducing head slider contacts with the surface of a magnetic storage disc in the stand-by condition where the disc is stopped, and an air gap is formed between the head slider and the surface of the disc, upon rotation of the disc at a present speed, to disengage the head slider from the disc during the recording or reproducing operation. During operation, the disc and the head slider may be abraded or wear at the time the head slider moves away from the surface of the disc, or the head slider accidently contacts the surface of the rotating disc during the recording or reproducing operation, instead of being maintained in a position floating above the surface of the disc. Contact during rotation of the disc can lead to scratching or other damage of the disc and the head slider.

Some protection of the magnetic recording layer is obtained by an overcoat, where various materials have been reported for use as overcoats. For example, U.S. Pat. No. 4,069,360 uses an amorphous inorganic oxide layer formed on the thin film of a magnetic metal medium and a silicon containing lubricant layer coated over the amorphous inorganic oxide layer. A silicon based oil or silicon type surface coupling agent serves as the lubricant which adheres to the inorganic outside layer. U.S. Pat. No. 4,152,487 employs a non-magnetic alloy disc substrate, a thin film of a magnetic metal medium applied on the substrate and a polysilicate layer to cover the magnetic metal medium. Further lubrication may be obtained using fluorinated polyethers. U.S. Pat. No. 4,268,556 employs fluorinated polymers having a low molecular weight and containing a functional group at the termini as a lubricant for magnetic recording discs. U.S. Pat. No. 4,529,659 uses a lubricant comprising a fluorinated hydrocarbon polymer having a terminal carboxyl group which forms a salt with an aminosilane layer chemically coupled to a silicon oxide layer applied on the magnetic storage medium of a disc. U.S. Pat. No. 5,227,211 employs a perfluoropolyether lubricant for coating onto a carbon overcoat.

Relevant Literature

Japanese patent application No. 92/31005 teaches the use of perfluoropolyether (average molecular weight 2.5 kD), which has been repeatedly extracted with a polar low molecular weight organic solvent, as a lubricant layer for magnetic recording media. Japanese patent No. 93/115551 teaches the use of perfluoropolyether as a lubricant on an amorphous carbon film overcoat of a magnetic recording disc. U.S. Pat. No 5,331,487 teaches the use of a lubricant vapor transport system cooperating with a reservoir to maintain lubrication of a magnetic recording disc. Japanese patent No. 91/144,008 teaches the use of a perfluoropolyether derivative as a lubricant for a magnetic recording disc, with a ratio of a fraction soluble to solvents to that insoluble to solvents in the lubricating layer of 0.65–1.22. U.S. Pat. No. 4,327,139 employs one or a mixture of perfluoropolyether oils. WO 94/08334 discloses a perfluoropolyether with a surface energy of less than 50 ergs/cm$^2$. JP 92/162367 which uses a perfluoropolyether lubricating layer (20 Å thickness).

SUMMARY OF THE INVENTION

Methods and devices are provided comprising magnetic recording discs coated with a narrow molecular weight fraction of a terminally functionalized perfluoropolyether having a molecular weight of at least about 1 kD. The coatings are vapor deposited to provide a thickness of at least about 0.5 nm. The resulting coating provides protection against stiction for extended periods of time.

DESCRIPTION OF THE SPECIFIC EMBODIMENTS

In accordance with the subject invention, methods and devices are provided for protecting magnetic recording discs by vapor deposition of a protective layer of a functionalized perfluoropolyether of a predetermined thickness. The perfluoropolyether is of a molecular weight of at least 1 kD, and usually not more than 4 kD, generally in the range of about 1.5 to 3.5 kD, having at least 90 weight percent, preferably at least about 95 weight percent, within a 2–3 kD range, preferably within a 2.5–3 kD range. The molecular weight range of the fraction will be less than about 4 kD, usually less than about 3 kD, preferably less than about 3 kD and may be in the range of about 0.5 to 2 kD, preferably in the range of about 0.5 to 1.5 kD.

The magnetic recording discs may be varied widely as to the magnetic material, nature of the overcoat, and manner of construction.

The magnetic material may be a cobalt-based alloy e.g., cobalt-chromium/nickel or cobalt-chromium/tantalum/platinum; iron oxides, such as gamma-ferric oxide; etc.

The overcoat or protective coating which is deposited on the magnetic layer may be any one of the common coatings, such as a carbon coating, where the carbon has been applied by vapor deposition, RF plasma or glow discharge, DC magnetron sputtering, or the like, which coating may be doped with hydrogen and/or nitrogen. Other protective coatings include silicates and silicones, polysilanes, silicon carbide, boron nitride, etc.

The sliders may be any of the conventional sliders and coated with a variety of coatings compatible with the disc coatings. Slider coatings include diamond-like carbon coated sliders, or other chemically inert thin film.

The polyfluoroether compositions are terminally functionalized with any one of a variety of polar groups, which groups include hydroxyl, carboxy, amino, or the like. These fluorinated oils are commercially available under such tradenames as Fomblin Z-Dol, Fomblin Am2001, Fomblin Z-DISOC (Montedison); Demnum (Daikin) and Krytox (Dupont). The commercially available terminally functionalized perfluoropolyethers are fractionated to provide for relatively narrow molecular weight fractions. Fractionation can be achieved by distillation, chromatography, e.g. HPLC, or other techniques which allows separation by molecular weight.

To provide the lubricating coats, the disc is vapor coated at an elevated temperature, where the perfluorinated polyethers are vaporized and allowed to deposit onto the surface of the disc in an enclosed environment, generally at ambient pressure. Temperatures will generally range from about 150° to 250° C., preferably about 175° to 225° C. Conveniently, 180° C. and 200° C. are found to provide reasonable deposition times. Deposition times will be at least about 5 min and not more than about thirty hours, preferably not more than about twenty hours. The thickness should be at least about 0.5 nm, preferably at least about 1 nm, more preferably at least about 1.2 nm and will generally be below about 3 nm, preferably in the range of about 1 to 3 nm, conveniently about 1.5 to 2.5 nm. Fractions of particular interest which provide higher film thicknesses are fractions of molecular weight range 2 to 3 kD.

After sufficient time for the desired lubricating layer thickness to be achieved, the magnetic disc is now ready for use. The resulting disc is capable of maintaining a level of stiction up to 20,000 CSS cycles of less than 4 g, preferably less than 3 g and particularly preferred not more than about 2 g.

The following examples are offered in way of illustration and not the way of limitation.

EXPERIMENTAL

Following the procedure of Coffey et al., IEE Trans. Magn. 30(6), 4146 (1994), magnetic recording discs (glass ceramic substrate, chromium underlayer, cobalt alloy, hydrogenated carbon overcoat) were coated with various fractions obtained from Fomblin Zdol2000. The Fomblin Zdol2000 has a molecular weight range of about 700 to 15,000 Dal, with a number average molecular weight of about 2,000 kDal. The fractions obtained had a narrow molecular weight distribution, with the fraction number indicating increasing molecular weight. The Fomblin Zdol2000 was fractionated by supercritical fluid fractionation. Twenty fractions were obtained. Using the above procedure, the rate of deposition at different temperatures for a single fraction and the film thickness obtained for a number of different fractions at 180° C. for 1 h were determined. The following tables indicate the results.

| VAPOR LUBRICATION KINETICS Lubricant Thickness (Å) | | | |
|---|---|---|---|
| | Temp. °C. | | |
| Deposition time, hours | 150 | 180 | 200 |
| 0.5 | 5 | 17 | |
| 1 | 12 | 18 | 19 |
| 5 | 17 | 20 | 21* |
| 20 | 19 | 25 | 27 |

*Deposition time was 6 hours

| VAPOR LUBRICATION OF FRACTIONATED ZDOL | |
|---|---|
| Zdol Fraction No. | Film Thickness, Å |
| 2 | 6 |
| 5 | 8 |
| 8 | 11 |
| 9 | 13 |
| 10 | 18 |
| 11 | 14 |
| 12 | 12 |
| 14 | 9 |
| 17 | 12 |

The discs were then tested for stiction using CSS cycles. A strain gauge on an I beam mounted near the head was used to determine stiction. The discs were vapor lubricated at 180° C. for one hour using the original composition as obtained from the supplier at a thickness of 7 Å, fraction 8 at a thickness of 6 Å and fraction 10 at a thickness of 16 Å. With no lubrication at all, stiction reached 9 g within 2000 cycles. With the original composition, stiction had reached between 6–7 g within 2000 cycles. By way of contrast, stiction was constant at 2 g for both fractions 8 and 10 out to 20,000 cycles.

It is evident from the above results, that by employing narrow fractions of functionalized perfluoropolyethers, one can achieve stable lubrication over extended periods of time. By vapor deposition, one is able to avoid the necessity of having specific functionalities for covalent bonding to the surface, so as to greatly simplify the manner of lubrication. Uniform coats are obtained, which are substantially maintained during use of the magnetic recording discs.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A magnetic recording disc comprising as a lubricating layer from 1 to 3 nm in thickness of a terminally functionalized perfluoropolyether having at least about 90 weight % of a molecular weight in the range of 2 to 3 kD, said lubricating layer vapor deposited at an elevated temperature.

2. A magnetic recording disc according to claim 1, wherein said terminally functionalized perfluoropolyether is functionalized with a member of the group consisting of hydroxyl, carboxy, or amino.

3. A magnetic recording disc according to claim 1, wherein said elevated temperature is in the range of 150° to 250° C.

4. A magnetic recording disc according to claim 1, wherein said layer is in the range of about 1.5 to 2.5 nm in thickness.

5. A magnetic recording disc according to claim 1, wherein said magnetic recording disc is able to maintain a level of stiction of up to 20,000 CSS cycles of not more than about 2 g.

6. A magnetic recording disc according to claim 1, wherein said disc has a carbon overcoat over a magnetic layer beneath said lubricating layer.

* * * * *